Patented Jan. 21, 1930

1,744,055

UNITED STATES PATENT OFFICE

WILFRED M. MURCH, OF HAMBURG, AND WINFRED J. CAUWENBERG, OF BUFFALO, NEW YORK, ASSIGNORS TO NATIONAL ANILINE & CHEMICAL CO., INC., OF NEW YORK, N. Y., A CORPORATION OF NEW YORK

PURIFICATION OF 2-AMINOANTHRAQUINONE

No Drawing.    Application filed October 19, 1925.  Serial No. 63,553.

This invention relates to a process for the purification of 2-aminoanthraquinone.

In the manufacture of dyestuffs from impure or crude 2-aminoanthraquinone, particularly certain vat dyestuffs of the indanthrene series such as, for example, flavanthrone (indanthrene yellow G) and indanthrene (indanthrene blue RS), there is usually present in the crude 2-aminoanthraquinone, prepared by methods well known to the art, certain impurities which have little, if any, harmful effect on the quality or the yield of the dyestuff produced. On the other hand, and particularly in a crude 2-aminoanthraquinone prepared by heating 2-chloranthraquinone under pressure with aqua ammonia in the absence or presence of a catalyst such as, for example, copper powder or copper salts, there is also usually present certain other impurities which have a harmful and deleterious effect on the purity or yield, or both, of the dyestuff produced. Further, these deleterious impurities appear to have a catalytic action since their presence in relatively small amounts, for example, one percent or less, produce ill effects of much greater magnitude than would be expected or seem possible.

According to the present invention, it has been found that impure or crude 2-aminoanthraquinone, and particularly when prepared by heating 2-chloranthraquinone under pressure with aqua ammonia in the presence or absence of catalysts, can be purified by treating it with an oxidant in the presence of water, and that such treatment in particular eliminates or partly eliminates, by destruction or otherwise, the deleterious impurities above mentioned which may be present. Any suitable oxidizing agent may be employed, for example, chromic acid or a soluble chromate or dichromate in the presence of an acid such as, for example, hydrochloric sulfuric, nitric or acetic acid, etc. Nitric acid, sodium hypochlorite, nascent or free chlorine in alkaline neutral or acid media, etc., may also be used as oxidants. Preferably, an amount of oxidizing agent is employed which contains an amount of available oxygen, or its equivalent, equal to about one to five percent, more particularly about one and one-half to two and one-half percent, by weight of the impure 2-aminoanthraquinone, and the amount of water employed is about 5 to 20 times the weight of crude 2-aminoanthraquinone or preferably is sufficient to form about one-tenth to a normal solution, more particularly about a one-fifth to one-half normal solution, of the oxidant calculated in terms of available oxygen or its equivalent. The invention may be carried out at temperatures ranging from room temperature (i. e., about 15° C.) to boiling temperature (i. e., around 95° to 100° to 105° C.) and under ordinary, reduced or superatmospheric pressures.

The following example will further illustrate the invention, but it will be understood that the invention is not limited thereto. The parts are by weight.

Example: 175 parts of crude 2-aminoanthraquinone and containing 155 to 160 parts of pure 2-aminoanthraquinone, obtained by heating 2-chloranthraquinone with aqua ammonia under pressure in the presence of copper sulfate, is added to a solution of 15 parts sodium dichromate and 40 parts of 66° Bé. sulfuric acid in 2000 parts of water. The mixture, with stirring, is heated at the boiling temperature for about one hour. It is then filtered, the residue washed with hot water until free from acid, and then pressed and dried. The product thus obtained, which comprises purified 2-aminoanthraquinone, is a reddish-brown powder, soluble in cold concentrated sulfuric acid to give an olive-drab solution, and when converted into flavanthrone (indanthrene yellow C) gives a superior product in yield of about 10 to 40 percent greater than that obtained from the crude 2-aminoanthraquinone. I regard this product as new product and constituting a part of the present invention.

In this example, the oxidizing agent is substantially a dilute aqueous solution of sodium dichromate and sulfuric acid. The solution contains about 1.5 to 2 percent of sulfuric acid and in terms of available oxygen is about two-tenths normal; and in most cases, the invention is best carried out in acid concentrations of about 1 to 5 percent. Other oxidants or acids, or both, may be employed.

We claim:

1. A process of purifying an impure 2-aminoanthraquinone obtainable by heating 2-chloranthraquinone with aqua ammonia under pressure which comprises subjecting said impure 2-aminoanthraquinone in the presence of water to the action of an oxidizing agent.

2. A process of purifying 2-aminonanthraquinone obtainable by heating 2-chloranthraquinone with aqua ammonia under pressure which comprises heating said 2-aminoanthraquinone with about a one-tenth to normal solution of an oxidant in the presence of about 1 to 5 percent of acid.

3. A process of purifying a crude 2-aminoanthraquinone obtainable by heating under pressure 2-chloranthraquinone with aqua ammonia which comprises heating said crude 2-aminoanthraquinone with a one-tenth to normal solution of an oxidizing agent containing an amount of available oxygen equal to about one to five percent by weight of the crude 2-aminoanthraquinone in the presence of about 1 to 5 percent acid.

4. A process of purifying an impure 2-aminoanthraquinone obtainable by heating 2-chloranthraquinone will aqua ammonia under pressure in the presence of a copper salt which comprises heating said impure 2-aminoanthraquinone with a one-tenth to normal solution of sodium dichromate and in the presence of sulfuric acid.

5. A process of purifying crude 2-aminoanthraquinone obtainable by heating 2-chloranthraquinone with aqua ammonia under pressure which comprises heating said 2-aminoanthraquinone with about a two-tenths normal sodium dichromate solution in the presence of about 1.5 to 2 percent sulfuric acid at a temperature of about the boiling point.

In testimony whereof we affix our signatures.

WILFRED M. MURCH.
WINFRED J. CAUWENBERG.